(12) United States Patent
Pryadkin

(10) Patent No.: US 8,754,571 B2
(45) Date of Patent: Jun. 17, 2014

(54) TWO-AXIS INERTIAL POSITIONER

(76) Inventor: Sergiy Pryadkin, Troy, MI (US)

( * ) Notice: Subject to any disclaimer, the term of this patent is extended or adjusted under 35 U.S.C. 154(b) by 265 days.

(21) Appl. No.: 13/287,495

(22) Filed: Nov. 2, 2011

(65) Prior Publication Data

US 2013/0108407 A1    May 2, 2013

(51) Int. Cl.
  *B65G 47/74*    (2006.01)
(52) U.S. Cl.
  USPC ............ 310/323.17; 310/323.18; 310/326; 310/328; 310/333; 414/749.1
(58) Field of Classification Search
  USPC ............ 310/323.17, 323.18, 326, 328, 333; 414/749.1
  See application file for complete search history.

(56) References Cited

U.S. PATENT DOCUMENTS

| 7,471,030 | B2 * | 12/2008 | Bennett et al. | 310/323.17 |
| 2004/0074300 | A1 * | 4/2004 | Karrai et al. | 73/514.34 |
| 2004/0140737 | A1 * | 7/2004 | Barillot et al. | 310/328 |
| 2005/0035687 | A1 * | 2/2005 | Xu et al. | 310/328 |
| 2010/0047052 | A1 * | 2/2010 | Burke et al. | 414/754 |
| 2010/0115671 | A1 * | 5/2010 | Pryadkin et al. | 850/1 |
| 2010/0263433 | A1 * | 10/2010 | Michel | 73/1.72 |

* cited by examiner

*Primary Examiner* — Derek Rosenau
*Assistant Examiner* — Bryan Gordon
(74) *Attorney, Agent, or Firm* — Young Basile Hanlon & MacFarlane PC

(57) ABSTRACT

A two-axis inertial positioner comprises a cascaded stack of orthogonal actuators mounted on a base and a platform frictionally mounted to the top surface of one of the actuators. An alignment cartridge overlies the platform and a clamp block overlies the alignment cartridge. Ball and groove bearings are provided between the platform, alignment cartridge and clamp block to provide two axes of motion corresponding to the two operational axes of the actuators.

4 Claims, 2 Drawing Sheets

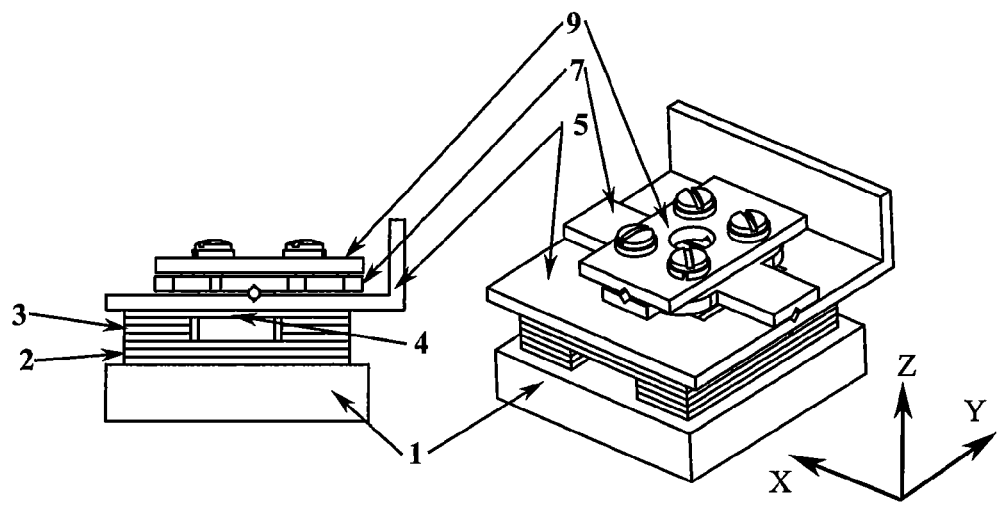
Fig. 1a
Fig. 1b
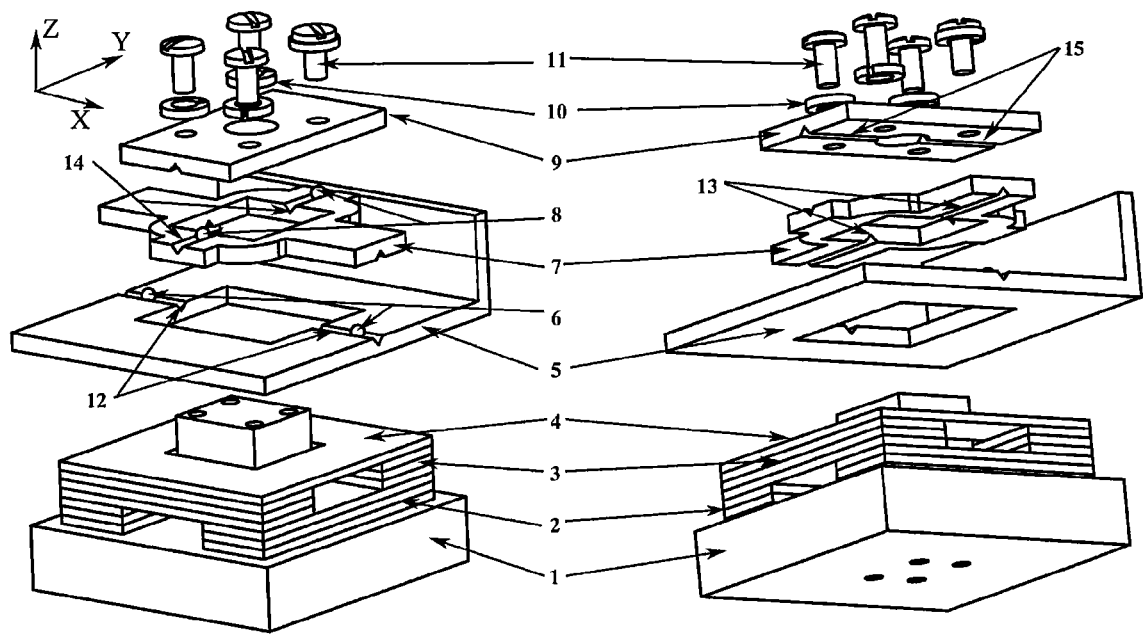
Fig. 2a
Fig. 2b

TWO-AXIS INERTIAL POSITIONER

FIELD OF THE INVENTION

The invention relates to the field of fine-incremental positioning devices using the "slip-stick" principle of operation.

BACKGROUND OF THE INVENTION

The "slip-stick" principle involves moving a "carrier" through a displacement increment fast enough in one direction to cause slippage between the carrier and an overlying platform such that the platform does not completely move through the same displacement increment as the carrier. The carrier is then caused to move more slowly in the reverse direction so as to displace the platform along with it. By repeating this cycle, the platform can be displaced very accurately.

SUMMARY OF THE INVENTION

This disclosure illustrates and describes a novel two-axis positioner using the slip-stick principle using groove and roller bearings to define the motion axes. Two actuators are cascaded on top of each other with mutually orthogonal axes of operation.

BRIEF SUMMARY OF THE DRAWINGS

The description herein makes reference to the accompanying drawings wherein like reference numerals refer to like parts throughout the several views and wherein:

FIGS. 1a and 1b are a combination of a side view and a perspective view of a two-axis positioner;

FIGS. 2a and 2b are a combination of two exploded perspective views of the positioner of FIG. 1.

DETAILED DESCRIPTION OF THE ILLUSTRATIVE EMBODIMENT

Figure 3:
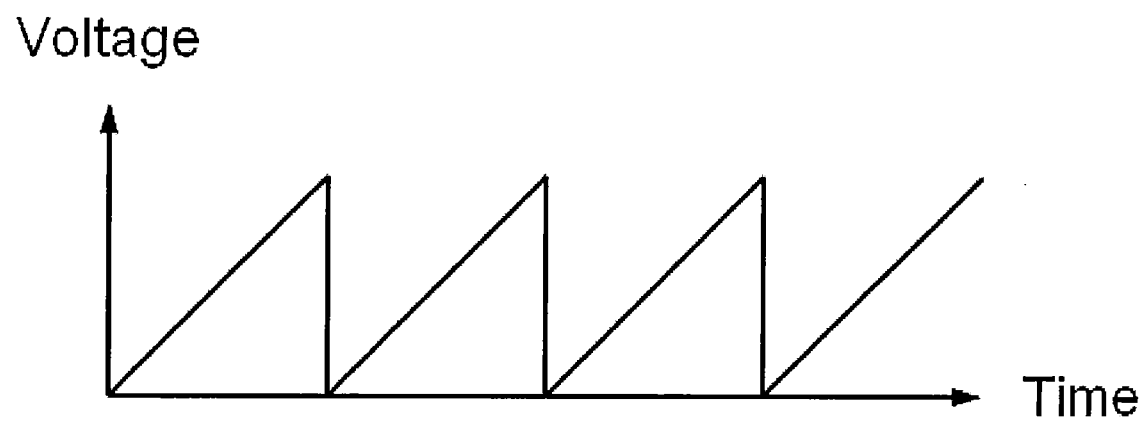
FIG. 3 is a diagram of the waveform of the electrical signal applied to the piezoelectric actuators of the positioner.

An XY inertial positioner is represented in FIGS. 1a, 1b, 2a and 2b. The positioner comprises a frame which includes base 1, a carrier 4, a movable platform 5 to which an object can be affixed for positioning, and two single-axis actuators (X actuator 2, and Y actuator 3) rigidly attached to each other. Base 1 may be a platform of another positioner, or any other suitable rigid object. A surface of the X actuator is bonded to the base while a surface of a Y actuator is bonded to the carrier 4. In this invention, a preferred embodiment of actuators 2, 3 is a piezoelectric actuator, more preferably, a stack of shear piezoelectric elements.

In another embodiment, one surface of a single axis actuator may be bonded to the base 1 while another surface of the other single axis actuator may be in direct frictional engagement with a movable platform 5.

Piezoelectric actuators 2, 3 are supplied with a plurality of electrical contacts. Application of electric voltage to a suitable pair of contacts creates a sheer stress in either X or Y direction. The waveform of applied voltage is chosen in such a way as to move the carrier 4 with respect to the base 1 fast enough to cause a slipping motion of the movable platform 5 with respect to the carrier along the interface between carrier and platform; and then to retract the carrier to bring it back to a starting position with respect to the base slowly enough for the platform to remain at rest with respect to the carrier. This process is routinely referred to as the "slip-stick" motion. An example of a suitable waveform is presented in FIG. 3.

The positioner further comprises two sets of bearings using rollers 6, 8, each bearing consists of two or more rollers. A roller may be spherical, as illustrated in FIG. 2. These two sets of rollers are spatially separated by alignment cartridge 7 and are allowed to roll between containing surfaces. Containing surfaces for set 6 are formed in movable platform 5 and alignment cartridge 7. Containing surfaces for set 8 are formed in clamping block 9 and alignment cartridge u.

Containing surfaces may be formed in an object in such a way that when a roller is placed in its working position, it is free to roll along one axis. We term such containing surfaces formed in one body "grooves". For example, containing surfaces 12 formed in platform 5 make up a groove; surfaces 13, 14 in alignment cartridge 7 each make up a groove; and surfaces 15 in clamping block 9 make up a groove.

The role of containing surfaces is to provide loading on the frictional contact at the bottom surface of platform 5, to define the axes x and y of positioning, and to prevent movable platform 5 from rotating with respect to base 1. Movable platform 5 can move only in X or Y directions.

The most preferred embodiment of this invention is described below. In reference to FIGS. 2 and 3:

groove 12 is formed in movable platform 5;

alignment cartridge 7 having groove 13 on one side and groove 14 on another side;

a group of rollers 6 is disposed in grooves 12 and 13;

grooves 12 and 13 together with ball group 6 allow motion of platform 5 with respect to alignment cartridge 7 only along X axis;

groove 15 is formed in clamping block 9;

a group of rollers 8 is disposed in groove 14 and 15;

grooves 14 and 15 together with ball 8 allow motion of alignment cartridge 7 with respect to clamping block 9 only along Y axis;

clamping block 9 is affixed to base 1 by spring-loaded screws 11 (in other implementation clamping block can be affixed to carrier 4 instead of the base). As an example, spring-loading is provided by lock washers 10.

The above-described embodiment allows the platform 5 to move with respect to base 1 only in X or Y direction without rotation.

What is claimed is:

1. A two-axis inertial positioner comprising:

a base (1);

an actuator assembly (3) having two small displacement, incrementally hi-directional actuators of a type selected from the group consisting of piezoelectric and magnetostrictive actuators, the actuators being operational along respective orthogonal axes and mounted to said base;

a carrier (4) mounted to said actuator assembly and having a friction surface;

a platform (5) having a friction surface in contact with the friction surface of said carrier (4) and being movable relative to said carrier by sliding, reciprocal, two directional displacement between said friction surfaces produced by said actuators in said actuator assembly according to the slip-stick principle;

an alignment cartridge (7) mounted to said platform (5) by means of a first roller bearing having an axis of motion corresponding to one of the two operational axes of said actuator assembly (3); and a clamp block (9) mounted to said alignment cartridge (7) by means of a second roller bearing having an axis of motion corresponding to the other of said operational axes of said actuator assembly (3).

2. The inertial positioner defined in claim I wherein the first roller bearing comprises one of more grooves formed in said platform and one or more corresponding grooves formed in said alignment cartridge and roller balls in said grooves which can roll only in one direction parallel to said friction surfaces.

3. An inertial positioner as defined in claim 1 wherein the second roller bearing comprises one or more grooves formed in said alignment cartridge and one or more corresponding grooves formed in said clamping block and roller balls in said grooves which can roll in only one direction parallel to said friction surfaces, the two directions of permitted rolling being non-parallel but corresponding to the operational axes of said actuator assembly.

4. The positioner of claim 3 further comprising a spring member disposed between the clamping block and said base effecting a loading force which is adjustable.

\* \* \* \* \*